United States Patent [19]

Ariyoshi et al.

[11] 3,920,626
[45] Nov. 18, 1975

[54] NOVEL ASPARTYL DIPEPTIDE ESTERS AS SWEETENERS

[75] Inventors: Yasuo Ariyoshi, Yokohama; Naohiko Yasuda; Tetsuo Yamatani, both of Kawasaki, all of Japan

[73] Assignee: Ajinomoto Co., Inc., Tokyo, Japan

[22] Filed: May 16, 1973

[21] Appl. No.: 360,671

[30] Foreign Application Priority Data
June 1, 1972   Japan................................ 47-54565

[52] U.S. Cl............................. 260/112.5; 426/217
[51] Int. Cl.²................... C07C 103/52; A23L 1/22
[58] Field of Search................................ 260/112.5

[56] References Cited
UNITED STATES PATENTS
3,769,333   10/1973   Lapidus et al.................. 260/112.5
3,798,204   3/1974   Nakajima et al................. 260/112.5

OTHER PUBLICATIONS

Mazur et al., J. Am. Chem. Soc., 91, 2684–2691 (1969).

*Primary Examiner*—Lewis Gotts
*Assistant Examiner*—Reginald J. Suyat
*Attorney, Agent, or Firm*—Hans Berman; Kurt Kelman

[57] ABSTRACT

N-α-L-aspartyl derivatives of lower alkyl esters of O-lower-alkanoyl-L-serine, β-alanine, γ-aminobutyric acid, and D-β-aminobutyric acid are up to 50 times sweeter than sucrose and suitable sweetening agents for food.

6 Claims, No Drawings

NOVEL ASPARTYL DIPEPTIDE ESTERS AS SWEETENERS

The present invention relates to novel dipeptide esters. More particularly, the dipeptide esters of this invention have the formula

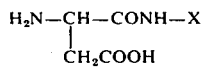

wherein X is

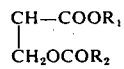

or

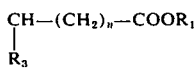

$R_1$ being alkyl having 1 to 4 carbon atoms, $R_2$ being alkyl having 1 to 6 carbon atoms, $R_3$ being hydrogen or methyl, and $n$ being the 1 or 2.

The alkyl radicals represented by $R_1$ are methyl, ethyl, n-propyl, i-propyl, n-butyl, i-butyl and t-butyl. The alkyl radicals represented by $R_2$ have 1 to 6 carbon atoms and include methyl, ethyl, n-propyl, i-propyl, n-butyl, i-butyl, t-butyl, pentyl, hexyl and cyclohexyl.

The dipeptide esters of the present invention share the unexpected property of possessing a sweet taste and of imparting their sweetness to a variety of edible materials. The term "edible materials" as used here and throughout this specification signifies all substances consumable by humans and other animals. Examples of such substances are foods, including food stuffs, prepared food items, chewing gum and beverages; food additives, including flavoring and coloring agents as well as flavor enhancers; drugs, including drugs for internal use and dental products; and feed.

It has been determined that the property of sweetness is affected by the stereochemistry of the individual amino acid units comprising the dipeptide structure. When X is of the formula (I), it has been determined that α-L-aspartyl-O-acyl-L-serine esters are sweet. Combination of isomers which contain the L-L-dipeptide esters, i.e. the DL-DL, L-DL and DL-L dipeptide esters, are sweet also. If X is of the formula (II), the dipeptide esters are sweet if the aspartic acid unit is in the L-configuration and $R_3$ is hydrogen. When $R_3$ is methyl, the dipeptide ester is sweet if the aspartic acid unit is in the L-configuration and the other amino acid unit is in the D-configuration. In this case, the L-D, DL-DL, L-DL and DL-D isomers are thus sweet.

The dipeptide esters of this invention have a sweet taste closely similar to that of sucrose. The sweetening potency of the dipeptide esters is dependent upon the kind of the dipeptide esters and the application conditions, but the dipeptide esters of this invention exhibit a greater potency than does sucrose. The aqueous solution of α-L-aspartyl-O-isobutyryl-L-serine methyl ester, for example is about 50 times as sweet as that of sucrose. The corresponding O-propionyl derivative is about 40 times as potent as sucrose. α-L-Aspartyl-β-alanine i-propyl ester in aqueous solution is about 6 to 8 times as sweet as sucrose.

The dipeptide esters of this invention do not have the unpleasant after-taste characteristic of known synthetic sweeteners such as saccharin. When the esters of this invention and the aforementioned synthetic sweeteners are used together, the unpleasant taste due to the latter is much improved, and furthermore, the sweetening potency of the latter is increased geometrically rather than arithmetically. The esters of this invention, especially the esters in which X is of the formula (II) are chemically stable.

The esters of this invention are water soluble substances which can be prepared in a variety of forms suitable for utilization as sweetening agents. Typical forms are tablets, powders, suspensions, solutions and syrups. Sweetening compositions may consist of the esters of this invention alone or in association with non-toxic carriers, i.e. non-toxic substances commonly employed in association with sweetening agents. Such carriers include liquids such as water, ethanol, sorbitol, glycerol, citric acid, edible oil, propylene glycol and liquid paraffin, and solids such as lactose, cellulose, starch, salt, amino acids, glucose and calcium sulfate.

Examples of specific edible materials which can be sweetened by the esters of this invention alone or in combination with carriers are; fruits; vegetables; juices; meat products such as ham, bacon and sausages; egg products; fruit concentrates; salad dressings; milk products such as ice cream and sherbets; syrups; corn, wheat and rice products such as cereals, bread and cake mixes; beverages such as coffee, tea and carbonated drinks; confections such as candy and chocolate. Illustrations of the preparation of such sweetened products are given below:

COFFEE

Enough α-L-aspartyl-O-isobutyryl-L-serine methyl ester was added to hot black coffee so that the amount of the dipeptide ester was 0.05% of the solution by weight. The coffee had a sweet taste similar to that produced by sucrose. Substitution of α-L-aspartyl-β-alanine isopropyl ester (1% by weight) in the above procedure resulted in the coffee having a pleasant after-taste.

GELATIN DESSERT

After 14 g of plain gelatin powder were added to 360 ml water and dissolved by heating for 5 minutes, 2.5 g of α-L-aspartyl-DL-β-aminobutyric acid methyl ester were added to the solution together with small amounts of imitation vanilla flavoring and coloring agent. The solution was poured into dishes and chilled to set. The obtained gelatin dessert was savory.

IMITATION ICE CREAM

Ice cream (butter fat content 4%, total fat content 8%) was prepared in a conventional manner from the following substances;

| | |
|---|---|
| Skim milk powder | 129 g |
| Unsalted butter | 73 g |
| Shortening | 60 g |
| Dextrose | 75 g |
| Glucose syrup solids | 30 g |
| Emulsifying agent (Emulsy Ml-1, produced by Riken Vitamin Oil Co., Ltd., Japan) | 4 g |
| Stabilizing agent (Unigel M, produced by Kyokuto Kagaku Sangyo Co., Ltd., Japan) | 4 g |
| Water | 945 g |
| Imitation vanilla flavoring | 4 ml |

| α-L-Aspartyl-O-isobutyryl-L-serine methyl ester | 0.5% by weight |

A palatable and flavory ice cream was obtained.

The novel dipeptide esters of this invention are produced by known methods of preparing aspartyl peptides. For example, the esters are produced by condensing an aspartic acid derivative wherein the amino group is masked by a protecting group such as carbobenzoxy, p-methoxycarbobenzoxy, t-butyloxycarbonyl, and formyl, and the β-carboxy group is masked by esterification with a suitable alcohol such as benzyl and t-butyl alcohol, with an alkyl ester of the other amino acid or a derivative thereof, or with a hydrohalide salt of the other amino acid ester in the presence of an equivalent amount of a base.

The condensation can be carried out by (i) converting the α-carboxy group of the aspartic acid derivative to an activated ester with p-nitrophenol, pentachlorophenol, N-hydroxysuccinimide, chloroacetonitrile or the like, (ii) using as condensing agents carbodiimides like N,N'-dicyclohexylcarbodiimide, carbonyldiimidazoles like carbonyldiimidazole and isonitriles like i-propylisonitrile, or (iii) using an agent capable of preparing mixed anhydrides such as ethyl chloroformate and i-butyl chloroformate. The esters are also prepared by contacting an N-protected aspartic anhydride with an alkyl ester of the other amino acid. The N-protecting groups are easily removed from the produced intermediates by hydrogenation in the presence of palladium-carbon catalyst or mineral acid treatment. When an N-protected aspartic anhydride, is used the β-isomer which has no sweet taste is produced simultaneously with the desired α-isomer. However, pure α-isomer may be readily obtained from the crude product by recrystallization because the amount of the α-isomer produced is much larger than that of the β-isomer.

Furthermore, the dipeptide esters of this invention may be produced by reacting a strong acid salt of aspartic anhydride such as the benzenesulfonate, hydrochloride and hydrobromide, with an alkyl ester of the other amino acid or derivative thereof.

The serine unit in the dipeptide ester can be acylated before or after the formation of the peptide bond. Acylation may be achieved by reacting acid chlorides and acid anhydrides with the dipeptide ester, or by reacting a serine ester derivative wherein the amino group is protected by carbobenzoxy, t-butyloxycarbonyl or formyl, with an acylating agent and then using the O-acyl serine ester for the formation of the peptide bond after removing the N-protecting group.

The following Examples are presented to further illustrate the present invention.

EXAMPLE 1

32.2 g Carbobenzoxyl-L-aspartic acid β-benzyl ester and 9.1 g triethylamine were dissolved in 240 ml chloroform. To the solution was added 9.9 g ethyl chloroformate at −5° to −10°C with stirring, and the mixture was stirred for additional 20 minutes at the same temperature.

To that solution was then added a solution of 20.2 g L-serine methyl ester hydrochloride and 13.0 g triethylamine in 240 ml chloroform dropwise at −5° to −10°C with stirring. The reaction mixture was stirred at room temperature for 3 hours and then washed successively with N-hydrochloric acid and water. The washed mixture was dried over anhydrous sodium sulfate and the solvent therein was evaporated.

The residue was recrystallized from a mixture of ethyl acetate and petroleum ether to yield 24 g β-benzyl-N-carbobenzoxy-L-aspartyl-L-serine methyl ester.

EXAMPLE 2.

6.8 g β-Benzyl-N-carbobenzoxy-L-aspartyl-L-serine methyl ester were dissolved in 80 ml pyridine. The solution was mixed with 3.1 g acetic anhydride with stirring under ice-cooling, and then stirred for additional 3 hours at room temperature.

The reaction mixture was poured into 800 ml water containing chips of ice. The crystals precipitated were isolated by filtration, and washed successively with 2% hydrochloric acid and water to yield 7.4 g of a solid crude product. The crude product was purified by recrystallization from a mixture of ethyl acetate and petroleum ether to yield 6.8 g β-benzyl-N-carbobenzoxy-L-aspartyl-O-acetyl-L-serine methyl ester, melting at 94.0°–95.5°C.

EXAMPLE 3

5.0 g β-Benzyl-N-carbobenzoxy-L-aspartyl-O-acetyl-L-serine methyl ester were suspended in a mixture of 90 ml methanol and 10 ml water. The suspension was mixed with 0.5 g 5% palladium-carbon catalyst, and hydrogen gas was passed with stirring for 5 hours. The catalyst was removed by filtration and the filtrate was distilled under reduced pressure. Recrystallization of the residue from methanol yielded 1.4 g α-L-aspartyl-O-acetyl-L-serine methyl ester which melted at 88.0°–89.5°C.

EXAMPLE 4.

6.8 g β-Benzyl-N-carbobenzoxy-L-aspartyl-L-serine methyl ester were dissolved in 80 ml pyridine. The solution was mixed with 3.9 g propionic anhydride with stirring under ice-cooling and then stirred for additional 3 hours at room temperature. The reaction mixture was poured into 800 ml water containing chips of ice. The crystals precipitated were isolated by filtration and washed successively with 2% hydrochloric acid and water to yield 7.9 g of the solid crude product. The crude product was purified by recrystallization from a mixture of ethyl acetate and petroleum ether to yield 6.7 g β-benzyl-N-carbobenzoxy-L-aspartyl-O-propionyl-L-serine methyl ester, melting at 95.0°–96.5°C.

EXAMPLE 5.

5.0 g β-Benzyl-N-carbobenzoxyl-L-aspartyl-O-propionyl-L-serine methyl ester were suspended in a mixture of 45 ml methanol and 5 ml water. The suspension was mixed with 0.5 g 5% palladium-carbon catalyst, and through the resulting suspension was then passed hydrogen gas with stirring for 5 hours. The catalyst was removed by filtration, and the filtrate was distilled under reduced pressure. Recrystallization of the residue from methanol yielded 1.4 g α-L-aspartyl-O-propionyl-L-serine methyl ester which melted at 86°–87°C.

EXAMPLE 6.

4.6 g β-Benzyl-N-carbobenzoxy-L-aspartyl-L-serine methyl ester were dissolved in 50 ml pyridine. The solution was mixed with 3.2 g butyric anhydride with stirring under ice-cooling, and then stirred for additional 3 hours at room temperature.

The reaction mixture was poured into 500 ml water containing chips of ice with stirring. The crystals precipitated were isolated by filtration and washed successively with 2% hydrochloric acid and water to produce 5.1 g of a crude product. The crude product was purified by recrystallization from a mixture of ethyl acetate and petroleum ether to yield 4.6 g β-benzyl-N-carbobenzoxy-L-aspartyl-O-butyryl-L-serine methyl ester which melted at 99°C.

EXAMPLE 7.

4.0 g β-Benzyl-N-carbobenzoxy-L-aspartyl-O-butyryl-L-serine methyl ester was suspended in a mixture of 45 ml methanol and 5 ml water. The suspension was mixed with 0.5 g 5% palladium-carbon catalyst, and hydrogen gas was passed with stirring for 5 hours. The catalyst was removed by filtration, and the filtrate was distilled under reduced pressure. Recrystallization of the residue from methanol yielded 1.2 g α-L-aspartyl-O-butyryl-L-serine methyl ester which melted at 102°–103°C.

EXAMPLE 8.

4.6 g β-Benzyl-N-cabobenzoxy-L-aspartyl-L-serine methyl ester were dissolved in 50 ml pyridine. There was added 3.2 g isobutyric anhydride with stirring under ice-cooling, and the mixture was stirred for additional 3 hours at room temperature.

The reaction mixture was poured into 500 ml water containing chips of ice with stirring. The crystals precipitated were isolated by filtration, and then washed successively with 2% hydrochloric acid and water to produce 5.1 g of the crude product. The crude product was purified by recrystallization from a mixture of ethyl acetate and petroleum ether to yield 4.7 g β-benzyl-N-carbobenzoxy-L-aspartyl-O-isobutyryl-L-serine methyl ester which melted at 95°–96°C.

EXAMPLE 9.

4 g β-Benzyl-N-carbobenzoxy-L-aspartyl-O-isobutyryl-L-serine methyl ester was suspended in a mixture of 45 ml methanol and 5 ml water. To the suspension was added 0.5 g 5% palladium-carbon catalyst, and hydrogen gas was passed with stirring for 5 hours. The catalyst was removed by filtration, and the filtrate was distilled under reduced pressure. Recrystallization of the residue from methanol yielded 1.3 g α-L-aspartyl-O-isobutyryl-L-serine methyl ester which melted at 116.0°–116.5°C.

EXAMPLE 10.

4.4 g L-Serine ethyl ester hydrochloride were suspended in 100 ml chloroform, and to the resulting suspension was added 2.5 g triethylamine, 7.4 g N-carbobenzoxy-L-aspartic acid β-benzyl ester and 4.3 g N,N'-dicyclohexyl-carbodiimide with stirring. After stirring for additional 3 hours at room temperature, a few drops of acetic acid were added and the precipitated N,N'-dicyclohexylurea was removed by filtration. The filtrate was washed successively with N-hydrochloric acid, 5% sodium bicarbonate solution and water, and then dried over anhydrous sodium sulfate.

The dried filtrate was distilled under reduced pressure, and the residue was recrystallized from a mixture of ethyl acetate and petroleum ether to produce 8.4 g of a crude product. The crude product was purified by recrystallization from a mixture of ethyl acetate and petroleum ether to yield 7.5 g β-benzyl-N-carbobenzoxy-L-aspartyl-L-serine ethyl ester which melted at 115°C.

EXAMPLE 11.

3.8 g β-Benzyl-N-carbobenzoxy-L-aspartyl-L-serine ethyl ester were dissolved in 40 ml pyridine. The solution was mixed with 2.0 g acetic anhydride with stirring under ice-cooling, and then stirred for additional 2 hours at room temperature.

The reaction mixture was poured into 500 ml water containing chips of ice with stirring. The crystals precipitated were isolated by filtration and recrystallized immediately from a mixture of ethyl acetate and petroleum ether to yield 2.9 g β-benzyl-N-carbobenzoxy-L-aspartyl-O-acetyl-L-serine ethyl ester which melted at 79°–80°C.

EXAMPLE 12.

2.5 g β-Benzyl-N-carbobenzoxy-L-aspartyl-O-acetyl-L-serine ethyl ester were suspended in a mixture of 80 ml ethanol and 20 ml water. The suspension was mixed with 0.5 g 5% palladium-carbon catalyst, and through the resulting suspension was then passed hydrogen gas with stirring for 4 hours. The catalyst was removed by filtration, and the filtrate was distilled under reduced pressure. Recrystallization of the residue from ethanol-water yielded 0.9 g α-L-aspartyl-O-acetyl-L-serine ethyl ester which melted at 136°–137°C.

EXAMPLE 13.

3.8 g β-Benzyl-N-carbobenzoxy-L-aspartyl-L-serine ethyl ester were dissolved in 40 ml pyridine. The solution was mixed with 3.2 g isobutyric anhydride with stirring under ice-cooling, and then stirred for additional 2 hours at room temperature.

The reaction mixture was added dropwise into 500 ml water containing chips of ice with stirring. The crystals precipitated were isolated by filtration and immediately recrystallized from a mixture of ethyl acetate and petroleum ether to yield 3.5 g β-benzyl-N-carbobenzoxy-L-aspartyl-O-isobutyryl-L-serine ethyl ester which melted at 72°–74°C.

EXAMPLE 14.

3.0 g β-Benzyl-N-carbobenzoxy-L-aspartyl-O-isobutyryl-L-serine ethyl ester were suspended in a mixture of 80 ml ethanol and 20 ml water. The suspension was mixed with 0.5 g 5% palladium-carbon catalyst, and through the resulting suspension was then passed hydrogen gas with stirring for 4 hours. The catalyst was removed by filtration, and the filtrate was distilled under reduced pressure. Recrystallization of the residue from ethanol yielded 0.9 g α-L-aspartyl-O-isobutyryl-L-serine ethyl ester which melted at 134°–135°C.

EXAMPLE 15.

3.3 g β-Benzyl-N-carbobenzoxy-L-aspartyl-L-serine ethyl ester were dissolved in 40 ml pyridine. The solution was mixed with 2.2 g butyric anhydride with stirring under ice-cooling, and then stirred for additional 3 hours at the same temperature.

The reaction mixture was poured into 500 ml water containing chips of ice with stirring. The crystals precipitated were isolated by filtration, washed successively with 2% hydrochloric acid and water, and immediately recrystallized from a mixture of ethyl acetate and petroleum ether to yield 2.9 g β-benzyl-N-carbobenzoxy-L-aspartyl-O-butyryl-L-serine ethyl ester which melted at 110°C.

EXAMPLE 16.

2.5 g β-Benzyl-N-carbobenzoxy-L-aspartyl-O-butyryl-L-serine ethyl ester were suspended in a mixture of 80 ml ethanol and 20 ml water. The suspension was mixed with 0.5 g 5% palladium-carbon catalyst, and through the resulting suspension was then passed hydrogen gas with stirring for 4 hours. The catalyst was removed by filtration, and the filtrate was distilled under reduced pressure. Recrystallization of the residue from ethanol yielded 0.6 g α-L-aspartyl-O-butyryl-L-serine ethyl ester which melted at 190°C.

EXAMPLE 17.

7.2 g Carbobenzoxy-L-aspartic acid β-benzyl ester and 2.02 g triethylamine were dissolved in 50 ml chloroform. To the resulting solution was added 2.2 g ethyl chloroformate with stirring at −5° to −10°C. The reaction mixture was stirred at the same temperature for additional 30 minutes.

Thereafter a solution of 4.02 g β-alanine isopropyl ester hydrochloride and 2.4 g triethylamine in 80 ml chloroform was added dropwise with stirring at −5° to −10°C. The reaction mixture was stirred at room temperature for additional 2 hours, and then concentrated under reduced pressure.

The residue was dissolved in 150 ml ethyl acetate. The resulting solution was washed successively with water, N-hydrochloric acid and 5% sodium bicarbonate solution, and again with water. The ethyl acetate layer was then evaporated.

The residue was dissolved in 100 ml 75% acetic acid, and the resulting solution was mixed with 0.5 g 5% palladium-carbon catalyst. Through the resulting mixture was passed hydrogen gas with stirring at room temperature for 4 hours. The catalyst was removed by filtration, and the filtrate was evaporated. Recrystallization of the residue from a mixture of water and isopropyl alcohol yielded 3.1 g α-L-aspartyl-β-alanine isopropyl ester which melted at 172°C.

EXAMPLE 18.

Substitution of 3.7 g β-alanine ethyl ester hydrochloride for the isopropyl ester hydrochloride in the procedure of Example 17 resulted in 3.4 g α-L-aspartyl-β-alanine ethyl ester melting at 157°C.

EXAMPLE 19.

Substitution of 3.7 g DL-β-aminobutyric acid methyl ester hydrochloride for alanine ester hydrochloride in the procedure of Example 17 resulted in 3.0 g α-L-aspartyl-DL-β-aminobutyric acid methyl ester melting at 137°C.

EXAMPLE 20.

10 g Carbobenzoxy-L-aspartic anhydride was dissolved in 50 ml methylene chloride, and to the resulting solution was added a solution of 7.4g γ-aminobutyric acid methyl ester hydrochloride and 4.8 g triethylamine in 50 ml methylene chloride dropwise with stirring at room temperature. After being left standing overnight at room temperature, the reaction mixture was evaporated. The residue was dissolved in 150 ml ethyl acetate, and the resulting solution was washed successively with water and N-hydrochloric acid, and again with water.

The ethyl acetate layer was evaporated, and the residue was dissolved in 75% aqueous acetic acid solution. The solution was mixed with 0.5g 5% palladium-carbon catalyst, and through the mixture was passed hydrogen gas with stirring for 4 hours. The catalyst was removed by filtration and the filtrate was evaporated. Crystallization of the residue from methanol-water yielded 0.7 g β-L-aspartyl-γ-aminobutyric acid methyl ester. The β-isomer was removed by filtration, and the filtrate was evaporated and the residue recrystallized from methanol-water to yield 4.5 g α-L-aspartyl-γ-butyric acid methyl ester melting at 152°C.

EXAMPLE 21.

Substitution of 6.7 g β-alanine methyl ester hydrochloride for the aminobutyric acid derivative in the procedure of Example 20 resulted in 4.5 g α-L-aspartyl-β-alanine methyl ester which melted at 192°C.

What is claimed is:

1. An α-N-aspartyl-amino acid ester of the formula

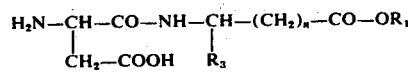

wherein $R_1$ is alkyl having 1 to 4 carbon atoms, $R_3$ is hydrogen or methyl, $n$ is 1 or 2, said aspartyl is in the L-configuration or the DL-configuration, and said amino acid is in the D-configuration or the DL-configuration when $R_3$ is methyl.

2. α-L-Aspartyl-β-alanine methyl ester.
3. α-L-Aspartyl-β-alanine ethyl ester.
4. α-L-Aspartyl-β-alanine isopropyl ester.
5. α-L-Aspartyl-β-aminobutyric acid methyl ester.
6. α-L-Aspartyl-D-β-aminobutyric acid methyl ester.

* * * * *

UNITED STATES PATENT AND TRADEMARK OFFICE
CERTIFICATE OF CORRECTION

PATENT NO. : 3,920,626
DATED : November 18, 1975
INVENTOR(S) : YASUO ARIYOSHI ET AL It is certified that error appears in the above-identified patent and that said Letters Patent are hereby corrected as shown below:

Column 8, claim 5, change the claim to read --

5. $\alpha$-L-Aspartyl-$\gamma$-aminobutyric acid methyl ester. --

Signed and Sealed this seventeenth Day of February 1976

[SEAL]

Attest:

RUTH C. MASON
*Attesting Officer*

C. MARSHALL DANN
*Commissioner of Patents and Trademarks*